(12) United States Patent
Laine et al.

(10) Patent No.: US 12,043,362 B2
(45) Date of Patent: Jul. 23, 2024

(54) DRAINING ARRANGEMENT OF A PROPULSION UNIT

(71) Applicant: ABB Oy, Helsinki (FI)

(72) Inventors: Jukka Laine, Helsinki (FI); Sven Willgren, Vantaa (FI); Toni Niska, Vantaa (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 18/064,433

(22) Filed: Dec. 12, 2022

(65) Prior Publication Data

US 2023/0182882 A1 Jun. 15, 2023

(30) Foreign Application Priority Data

Dec. 14, 2021 (EP) .................................. 21214224.4

(51) Int. Cl.
*B63H 21/38* (2006.01)
*B63B 13/00* (2006.01)
(Continued)

(52) U.S. Cl.
CPC .............. *B63H 21/38* (2013.01); *B63B 13/00* (2013.01); *B63H 2005/075* (2013.01);
(Continued)

(58) Field of Classification Search
CPC ...... B63H 21/38; B63H 20/001; B63H 5/125; B63H 2005/075; B63H 2005/1254; B63B 13/00; G05D 16/2013
(Continued)

(56) References Cited

U.S. PATENT DOCUMENTS 3,105,455 A * 10/1963 Baldwin .................. B63H 5/08
  440/75
3,913,513 A * 10/1975 Pedone .................. B63B 29/16
  210/194

(Continued)

FOREIGN PATENT DOCUMENTS

CN  112550656 A  3/2021
EP  1213221 A1  6/2002
(Continued)

OTHER PUBLICATIONS

European Search Report; Application No. EP 21 21 4224; Issued: Jun. 2, 2022; 2 Pages.

*Primary Examiner* — Minh Q Le
(74) *Attorney, Agent, or Firm* — Whitmyer IP Group LLC

(57) ABSTRACT

A draining arrangement of a propulsion unit of a marine vessel. The propulsion unit includes a shell structure. The shell structure limiting at least one bottom section configured to receive liquids. The draining arrangement including a pneumatically operated drainage arrangement including an intermediate tank within the shell structure, a pressurizing arrangement functionally connected to the intermediate tank and configured to selectively provide a vacuum in the intermediate tank or an excess pressure in the intermediate tank, a first liquid line that is provided between the intermediate tank and said at least one bottom section, and a second liquid to line that is provided between the intermediate tank and a collector arrangement within the hull of the marine vessel.

18 Claims, 3 Drawing Sheets

(51) Int. Cl.
*B63H 5/07* (2006.01)
*B63H 5/125* (2006.01)
*B63H 20/00* (2006.01)
*G05D 16/20* (2006.01)

(52) U.S. Cl.
CPC ...... *B63H 5/125* (2013.01); *B63H 2005/1254* (2013.01); *B63H 20/001* (2013.01); *G05D 16/2013* (2013.01)

(58) Field of Classification Search
USPC ........... 137/14, 601.2, 565.15; 417/111, 148, 417/384
See application file for complete search history.

(56) References Cited

U.S. PATENT DOCUMENTS

| | | | | |
|---|---|---|---|---|
| 3,927,860 A * | 12/1975 | Smith | ...................... | B63B 13/00 251/294 |
| 4,147,474 A * | 4/1979 | Heimdal | ................. | F04D 7/065 417/54 |
| 4,667,616 A * | 5/1987 | Mahon | .................... | B63B 13/00 114/184 |
| 4,787,328 A * | 11/1988 | Inoue | ...................... | B63B 13/00 114/55.51 |
| 4,789,367 A * | 12/1988 | Fulks | ...................... | B63B 13/00 440/88 N |
| 6,073,655 A * | 6/2000 | Thompson | .............. | F16K 51/02 137/861 |
| 6,338,309 B1 * | 1/2002 | Michelson | .............. | B63B 13/00 114/183 R |
| 6,506,085 B1 * | 1/2003 | Casey | ...................... | B63J 4/006 440/88 P |
| 2007/0068439 A1* | 3/2007 | Johnson | .................. | B63B 13/00 114/184 |
| 2007/0095268 A1* | 5/2007 | Bourret | .................... | B63B 13/00 114/183 R |
| 2010/0180810 A1* | 7/2010 | Liberg | ..................... | B63J 4/002 114/125 |
| 2015/0004003 A1* | 1/2015 | Roberts | ................. | F04B 45/043 417/384 |
| 2018/0262131 A1* | 9/2018 | Russick | .................. | B63B 13/00 |
| 2019/0016431 A1* | 1/2019 | Vihtanen | ................. | B63H 5/125 |
| 2019/0293195 A1* | 9/2019 | Eberstadt, III | .......... | F16K 15/04 |

FOREIGN PATENT DOCUMENTS

| | | |
|---|---|---|
| EP | 3279079 A1 | 2/2018 |
| JP | 2002234493 A | 8/2002 |
| JP | 53177711 Y2 | 7/2014 |
| JP | 2015027871 A | 2/2015 |
| JP | 2022125024 A | 8/2022 |
| JP | 71078164 A | 11/2022 |

\* cited by examiner

DRAINING ARRANGEMENT OF A PROPULSION UNIT

TECHNICAL FIELD

The invention relates to a draining arrangement of a propulsion unit as defined in the claims.

BACKGROUND

A problem with pneumatically operated drainage arrangements such as with vacuum pumps is their maximum theoretical suction height capacity, that as sea level is about 10.33 m. This means that if the suction height is around 7 meters, the suction capacity (liters per minute) will be very low. This causes problems when draining bottom sections of large propulsion unit for marine vessels, where the height of the shell structure of the propulsion unit can exceed 8 meters, which means that there is a need to lift liquid from the bottom section of the shell structure of the propulsion unit over 8 meters if the liquid from the bottom section of the shell structure of the propulsion unit is to be moved out of the propulsion unit and to be moved into a place within the hull of the marine vessel

SUMMARY

The object of the invention is to provide a drainage arrangement that solves the above-identified problem.

SHORT DESCRIPTION OF THE INVENTION

The drainage arrangement and preferred embodiments of the drainage arrangement are defined in the claims.

The invention is based on providing within the shell structure of the propulsion unit an intermediate tank that enables to perform the drainage of the propulsion unit in two steps. In a first step, liquid is sucked from a bottom section of the shell structure of the propulsion unit into the intermediate tank that is provided within the shell structure of the propulsion unit. This means that the suction height can be low and that the suction capacity will be high. In a second step, liquid that has been sucked into the intermediate tank is pressed from the intermediate tank out of the propulsion unit to a collector arrangement provided within the hull of the marine vessel.

BRIEF DESCRIPTION OF THE DRAWINGS

In the following the invention will described in more detail by referring to the figures of which

DETAILED DESCRIPTION

Figure 1:
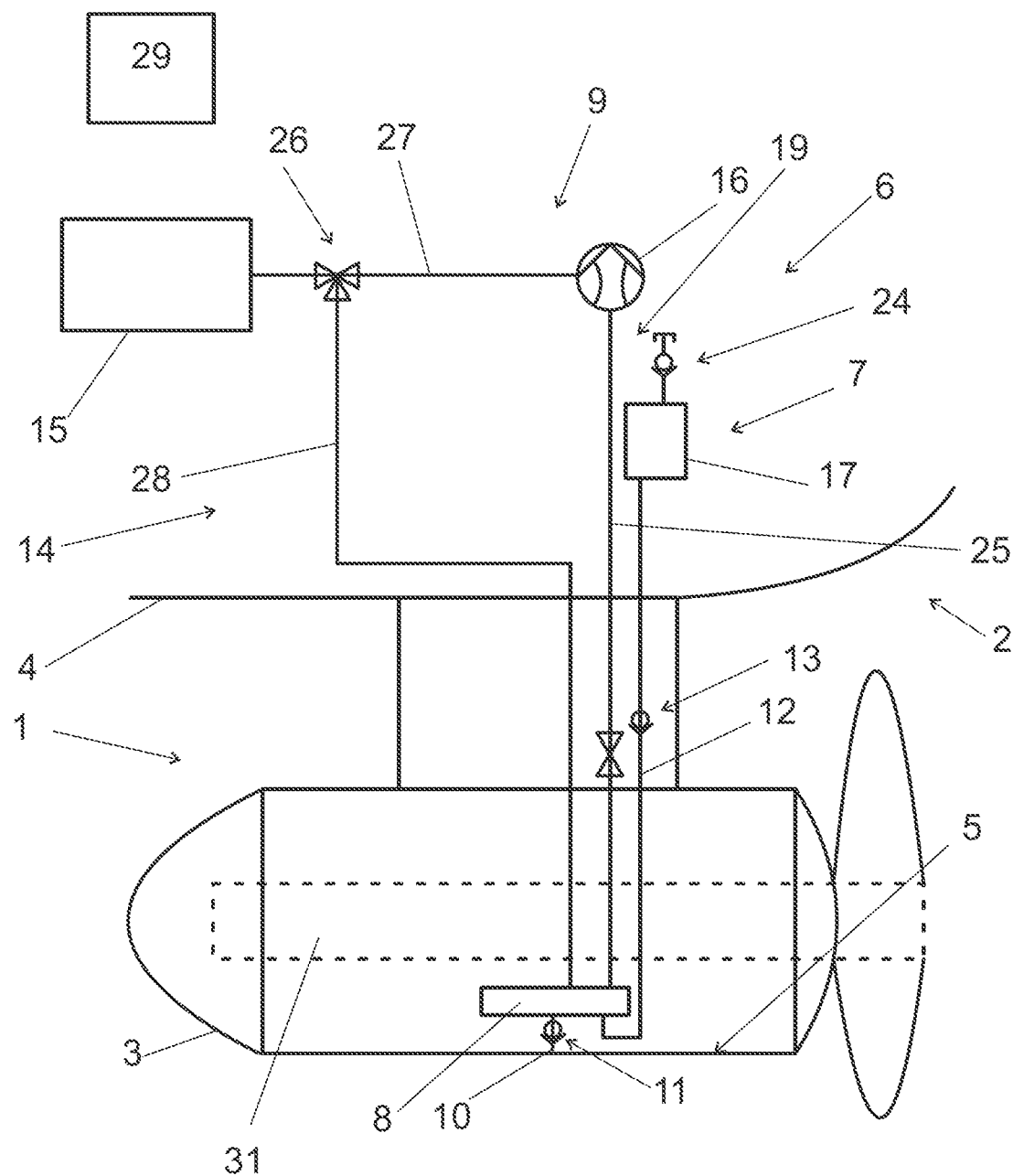
FIG. 1 shows a first embodiment of the drainage arrangement.

Next the draining arrangement of a propulsion unit 1 such as an azimuthing propulsion unit of a marine vessel 2 and some embodiments and variants of the will be described in greater detail.

The propulsion unit 1 comprises a shell structure 3 mounted below a hull 4 of the marine vessel such that the shell structure 3 is at least partly immersed in water, when the marine vessel 2 floats in water.

The shell structure 3 limiting at least one bottom section 5 configured to receive liquids formed within the shell structure 3 and/or liquids entering the shell structure 3 from the outside of the shell structure 3.

The draining arrangement comprises a pneumatically operated drainage arrangement 6 in fluid connection with said at least one bottom section 5.

The pneumatically operated drainage arrangement 6 is configured to at least partly drain said at least one bottom section 5 and to transfer liquid from said at least one bottom section 5 to a collector arrangement 7, preferably into a collector tank 17 of a collector arrangement 7, provided within the hull 4 of the marine vessel 2.

The pneumatically operated drainage arrangement 6 comprises an intermediate tank 8 within the shell structure 3 of the propulsion unit 1.

The intermediate tank 8 is located at a vertical level that is above said at least one bottom section 5.

The pneumatically operated drainage arrangement 6 comprises a pressurizing arrangement 9 functionally connected to the intermediate tank 8 and configured to selectively provide a vacuum in the intermediate tank 8 or an excess pressure in the intermediate tank 8.

The pneumatically operated drainage arrangement 6 comprises a first liquid line 10 that is provided between the intermediate tank 8 and said at least one bottom section 5 of the shell structure 3 of the propulsion unit 1.

The first liquid line 10 is provided with a first check valve 11 configured to prevent liquid to flow from the intermediate tank 8 to said at least one bottom section 5 and configured to allow liquid to flow from said at least one bottom section 5 to the intermediate tank 8.

The pneumatically operated drainage arrangement 6 comprises a second liquid line 12 that is provided between the intermediate tank 8 and the collector arrangement 7 within the hull 4 of the marine vessel 2. The second liquid line 12 extends preferably, but not necessarily, as illustrated in the figures, between the bottom of the intermediate tank 8 and the collector arrangement 7 within the hull 4 of the marine vessel 2 so as to ensure better draining of the intermediate tank 8.

The second liquid line 12 is provided with a second check valve 13 configured to prevent liquid to flow from the collector arrangement 7 provided within the hull 4 of the marine vessel 2 to the intermediate tank 8 and configured to allow liquid to flow from intermediate tank 8 to collector arrangement 7 provided within the hull 4 of the marine vessel 2.

Said at least one bottom section 5 is preferably, but not necessarily, located at a vertical level below the propeller shaft 31.

The intermediate tank 8 within the shell structure 3 can be located at a vertical level above or below the propeller shaft 31 or at the vertical level of the propeller shaft 31.

The pressurizing arrangement 9 comprises preferably, but not necessarily, a pneumatic circuit 14 that is in fluid connection with a pneumatic system 15 provided within the hull 4 of the marine vessel 2 and that is in fluid connection with the intermediate tank 8. The pneumatic circuit 14 is configured to operate in a vacuum mode that applies a vacuum to the intermediate tank 8 so as to effect sucking of liquid from said at least one bottom section 5 of the shell structure 3 of the propulsion unit 1 in the first liquid line 10 into the intermediate tank 8 within the shell structure 3 of the propulsion unit 1, and in a pressure mode that applies a pressure to the intermediate tank 8 so as to effect pressing of liquid from the intermediate tank 8 into the second liquid line 12 and in the second liquid line 12 into the collector arrangement 7 provided within the hull 4 of the marine vessel 2.

If the pressurizing arrangement 9 comprises a pneumatic circuit 14 connected and operable as presented, the pneumatic circuit 14 comprises in some embodiments of the drainage arrangement an aspirator pump 16 or a vacuum ejector or the like that is driven by the pneumatic system 15 provided within the hull 4 of the marine vessel 2 and that is by a first gas line 25 in fluid connection with the intermediate tank 8 within the shell structure 3 of the propulsion unit 1. In such embodiments of the drainage arrangement, the pneumatic circuit 14 comprises a valve arrangement 26 for selectively (i) feeding pressurized gas from the pneumatic system 15 provided within the hull 4 of the marine vessel 2 in a second gas line 27 to the aspirator pump 16 so as to operate the pneumatic circuit 14 in the vacuum mode and so as to provide a vacuum in the first gas line 25 and in the intermediate tank 8 and in the first liquid line 10 so as to effect sucking of liquid from said at least one bottom section 5 of the shell structure 3 of the propulsion unit 1 in the first liquid line 10 into the intermediate tank 8 within the shell structure 3 of the propulsion unit 1, or (ii) feeding pressurized gas from the pneumatic system 15 provided within the hull 4 of the marine vessel 2 in a third gas line 28 to the intermediate tank 8 within the shell structure 3 so as to operate the pneumatic circuit 14 in the pressure mode so as to effect pressing of liquid from the intermediate tank 8 into the second liquid line 12 and in the second liquid line 12 into the collector arrangement 7 provided within the hull 4 of the marine vessel 2. In such embodiments of the drainage arrangement, the by the valve arrangement is functionally connected to a valve control means 29 configured to switch the pneumatic circuit between the vacuum mode and the pressure mode.

If the pressurizing arrangement 9 comprises a pneumatic circuit 14 connected and operable as presented and pneumatic circuit 14 comprises a first gas line 25 as presented, the collector arrangement 7 provided within the hull 4 of the marine vessel 2 comprises in some embodiments of the drainage arrangement a collector tank 17 that forms a part of the first gas line 25 of the pneumatic circuit 14 so that the collector tank 17 of the collector arrangement 7 provided within the hull 4 of the marine vessel 2 is in the first gas line 25 of the pneumatic circuit 14 arranged between the aspirator pump 16 and the intermediate tank 8 within the shell structure 3.

Figure 2:
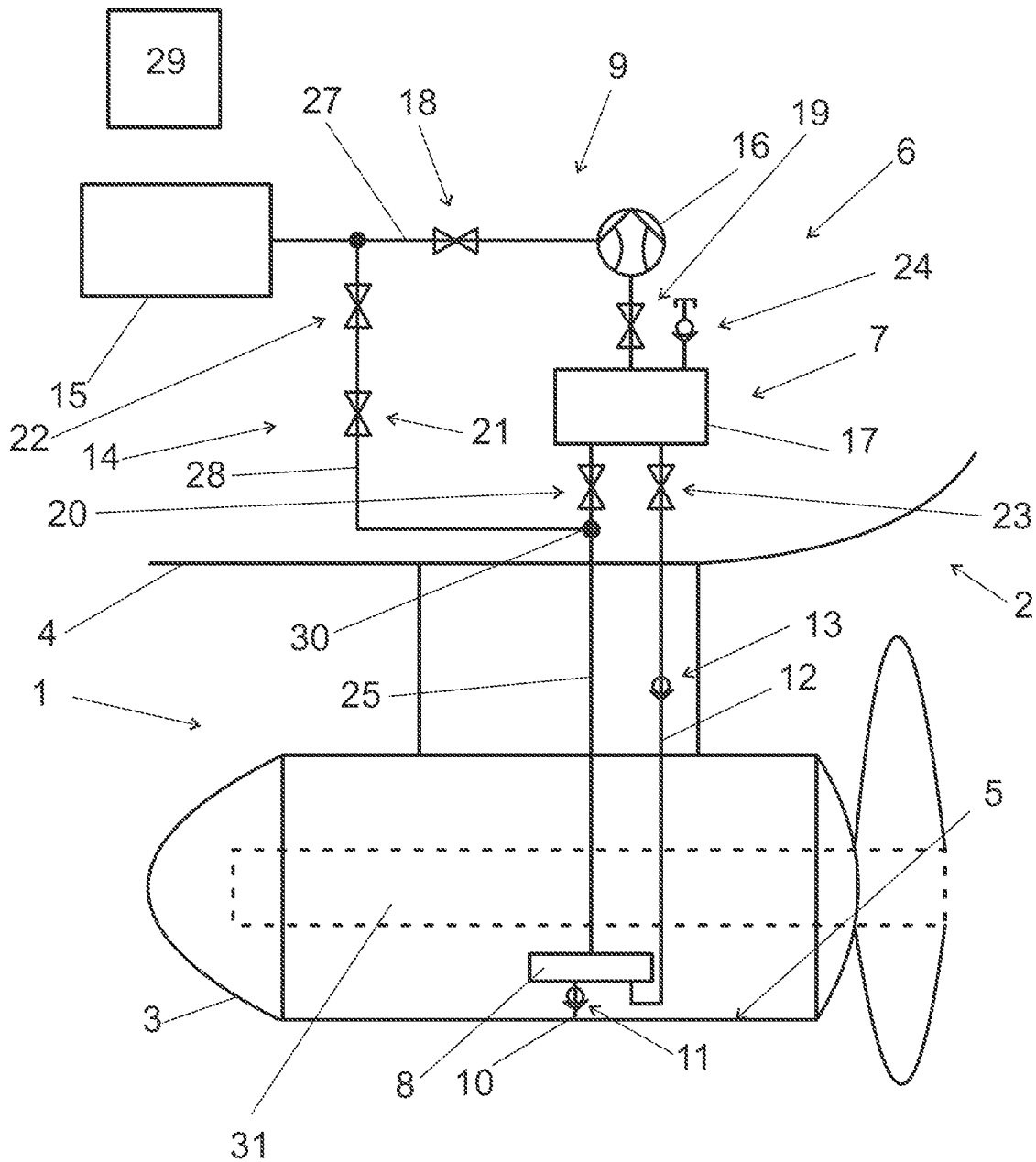
FIG. 2 shows a second embodiment of the drainage arrangement.

If the pneumatic circuit 14 of the draining arrangement comprises a first gas line 25, a second gas line 27, and a third gas line 28 as presented and if the collector tank 17 forms a part of the first gas line 25 of the pneumatic circuit 14 as presented, the third gas line 28 of the pneumatic circuit 14 can, as illustrated in FIG. 2, at a connection point 30 between the collector tank 17 of the collector arrangement 7 and the intermediate tank 8 provided within the shell structure 3 be in fluid connection with the first gas line 25 of the pneumatic circuit 14 so that the first gas line 25 and the third gas line 28 between the connection point 30 and the intermediate tank 8 within the shell structure 3 have common piping. In such embodiments, a third valve 20 is provided in the first gas line 25 of the pneumatic circuit 14 between the collector tank 17 of the collector arrangement 7 provided within the hull 4 of the marine vessel 2 and the connection point 30, and the third valve 20 is functionally connected to the valve control means 29 configured to switch the pneumatic circuit 14 between the vacuum mode and the pressure mode. The valve control means 29 is configured to open the third valve 20 when operating the pneumatic circuit 14 in the vacuum mode so as to allow a vacuum to form in the first gas line 25 and in the intermediate tank 8. The valve control means 29 is configured to close the third valve 20 when operating the pneumatic circuit 14 in the pressure mode so as to prevent pressurized fluid to enter the collector tank 17 of the collector arrangement 7 from the third gas line 28 of the pneumatic circuit 14.

If the pressurizing arrangement 9 comprises a pneumatic circuit 14 connected and operable as presented and if the pneumatic circuit 14 of the draining arrangement comprises a first gas line 25, a second gas line 27, and a third gas line 28 as presented, the by the valve arrangement 26 can, as illustrated in FIG. 2, comprise a first valve 18 in the second gas line 27 of the pneumatic circuit 14 between the pneumatic system 15 provided within the hull 4 of the marine vessel 2 and the aspirator pump 16, and the valve arrangement 26 can comprise a fourth valve 21 in the third gas line 28 of the pneumatic circuit 14 between the pneumatic system 15 provided within the hull 4 of the marine vessel 2 and the intermediate tank 8 within the shell structure 3, and the first valve 18 and the fourth valve 21 can be functionally connected to the valve control means 29 configured to switch the pneumatic circuit 14 between the vacuum mode and the pressure mode. The valve control means 29 can be configured to switch the vacuum mode on by closing the fourth valve 21 and by opening the first valve 18 in the second gas line 27 to feed pressurized fluid from the pneumatic system 15 provided within the hull 4 of the marine vessel 2 to the aspirator pump 16 to create a vacuum in the collector tank 17 of the collector arrangement 7 provided within the hull 4 of the marine vessel 2 and to create a vacuum in the first gas line 25 and to create a vacuum in the intermediate tank 8 within the shell structure 3 so as to effect suctioning of liquid from said at least one bottom section 5 to the intermediate tank 8 in the first liquid line 10. The valve control means 29 can being configured to switch the pressure mode on by closing the first valve 18 in the second gas line 27 and by opening the fourth valve 21 in the third gas line 28 to feed pressurized fluid from the pneumatic system 15 provided within the hull 4 of the marine vessel 2 in the third gas line 28 and in the first gas line 25 to the intermediate tank 8 within the shell structure 3 so as to effect pressing of liquid from the intermediate tank 8 within the shell structure 3 at least one bottom section 5 to the collector tank 17 of the collector arrangement 7 provided within the hull 4 of the marine vessel 2 in the second liquid line 12.

If the pneumatic circuit 14 of the draining arrangement comprises a first gas line 25, a second gas line 27, and a third gas line 28 as presented and if the collector tank 17 forms a part of the first gas line 25 of the pneumatic circuit 14 as presented, the pneumatic circuit 14 can comprise a second valve 19 in the pneumatic circuit 14 between the aspirator pump 16 and the collector tank 17 of the collector arrangement 7 provided within the hull 4 of the marine vessel 2, wherein the valve control means 29 being, when switching on the vacuum mode, configured to open the second valve 19, and wherein the valve control means 29 being, when switching on the pressure mode, configured to close the second valve 19.

If the pressurizing arrangement 9 comprises a pneumatic circuit 14 connected and operable as presented, a pressure regulating valve 22 can be provided in the pneumatic circuit 14 between the pneumatic system 15 provided within the hull 4 of the marine vessel 2 and the intermediate tank 8 within the shell structure 3.

If the pressurizing arrangement 9 comprises a pneumatic circuit 14 connected and operable as presented, a fifth valve 23 can be provided in the second liquid line 12, wherein by the valve control means 29 being, when switching on the vacuum mode, configured to close the fifth valve 23, and wherein the valve control means 29 being, when switching on the pressure mode, configured to open the fifth valve 23.

If the collector arrangement 7 provided within the hull 4 of the marine vessel 2 comprises a collector tank 17, the collector tank 17 can be provided with a check valve 24 configured to regulate the pressure inside the collector tank 17.

Figure 3:
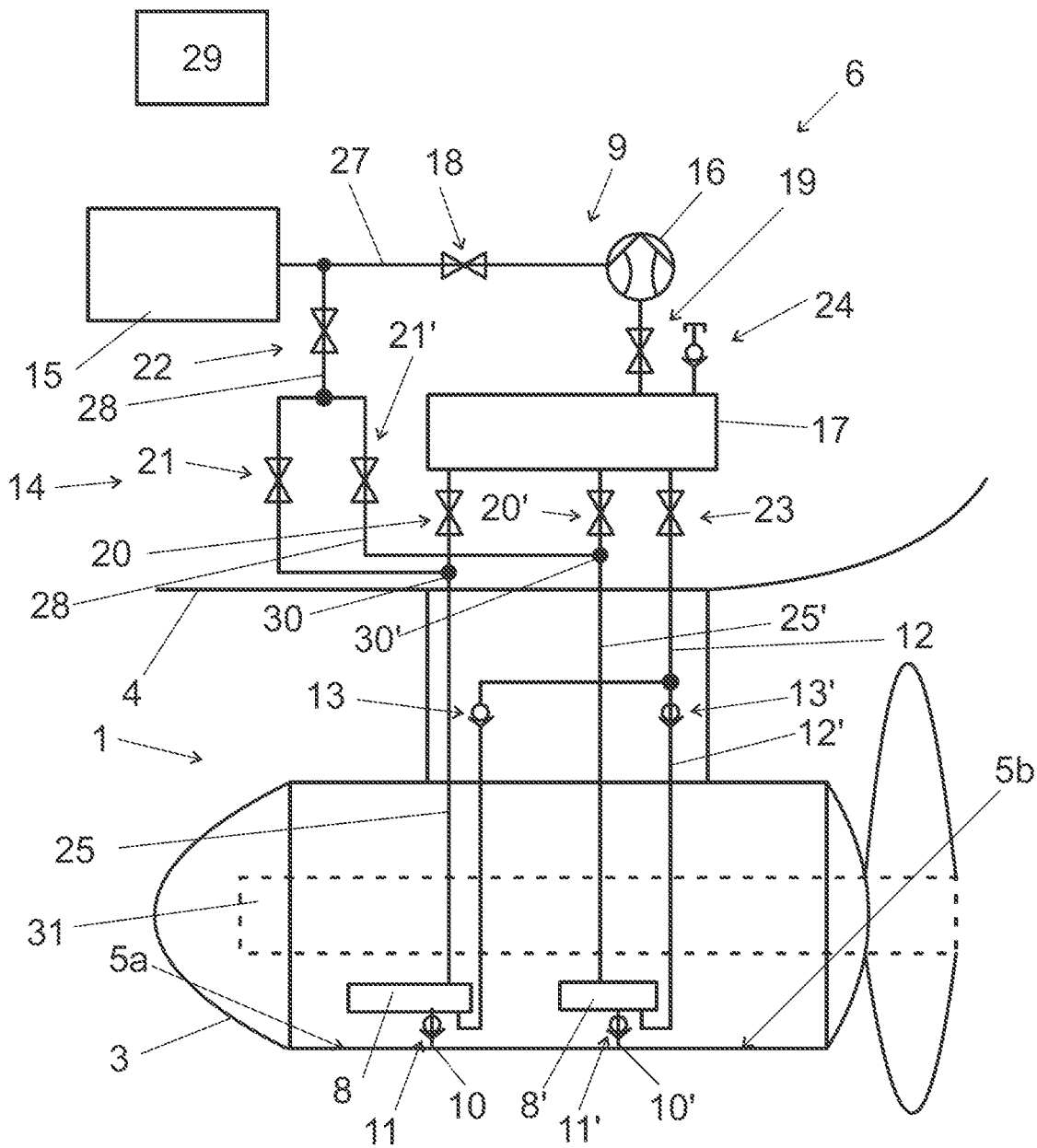
FIG. 3 shows a third embodiment of the drainage arrangement.

The pneumatically operated draining arrangement of the embodiment of the draining arrangement illustrate in FIG. 3 comprises in addition to an intermediate tank 8 an auxiliary intermediate tank 8' that is arranged within the shell structure 3 and that is located at a vertical level that is above another bottom section 5', which is limited by the shell structure 3 and which is configured to receive liquids formed within the shell structure 3 and/or liquids entering the shell structure 3 from the outside of the shell structure 3. In FIG. 3, the intermediate tank 8 is arranged at a non-drive end of the propulsion unit 1 and the auxiliary intermediate tank 8' is arranged at a drive end of the propulsion unit 1. In the embodiment illustrated in FIG. 3, the pressurizing arrangement 9 is additionally functionally connected to the auxiliary intermediate tank 8' so that the pressurizing arrangement 9 is configured to selectively provide a vacuum in the auxiliary intermediate tank 8' or an excess pressure in the auxiliary intermediate tank 8'. In the embodiment illustrated in FIG. 3, an auxiliary first liquid line 10' is provided between the auxiliary intermediate tank 8' and said another bottom section 5' and an auxiliary first check valve 11' configured to prevent liquid from flowing from the auxiliary intermediate tank 8' to said another bottom section 5' and configured to allow liquid to flow from said another bottom section 5' to the auxiliary intermediate tank 8' is provided in the auxiliary first liquid line 10'. In the embodiment illustrated in FIG. 3, an auxiliary second liquid line 12' is provided between the auxiliary intermediate tank 8' and the second liquid line 12 and an auxiliary second check valve 13' configured to prevent liquid from flowing from the second liquid line 12 to the auxiliary intermediate tank 8' and configured to allow liquid to flow from the auxiliary intermediate tank 8' to the second liquid line 12 is provided in the auxiliary first liquid line 10'. The auxiliary second liquid line 12' extends preferably, but not necessarily, as illustrated in the figures, between the bottom of the auxiliary intermediate tank 8' and the collector arrangement 7 within the hull 4 of the marine vessel 2 so as to ensure better draining of the auxiliary intermediate tank 8'. In the embodiment illustrated in FIG. 3, an auxiliary third gas line 28' is provided between the third gas line 28 and the auxiliary intermediate tank 8' so as to in the pressure mode enable feeding of pressurized gas from the pneumatic system 15 provided within the hull 4 of the marine vessel 2 via the third gas line 28 to the auxiliary third gas line 28' and in the auxiliary third gas line 28' to the auxiliary intermediate tank 8'. An auxiliary fourth valve 21' provided in the auxiliary third gas line 28' and the auxiliary fourth valve 21' is functionally connected to the valve control means 29 configured to switch the pneumatic circuit 14 between the vacuum mode and the pressure mode. In the embodiment illustrated in FIG. 3, the auxiliary third gas line 28' of the pneumatic circuit 14 is at an auxiliary connection point 30' between the collector tank 17 of the collector arrangement 7 and the auxiliary intermediate tank 8' within the shell structure 3 in fluid connection with the auxiliary first gas line 25' of the pneumatic circuit 14 so that the auxiliary first gas line 25' and the auxiliary third gas line 28' between the auxiliary connection point 30' and the auxiliary intermediate tank 8' within the shell structure 3 have common piping. In the embodiment illustrated in FIG. 3, an auxiliary third valve 20' is provided in the auxiliary first gas line 25' between the auxiliary connection point 30' the collector tank 17 of the collector arrangement 7 provided within the hull 4 of the marine vessel. The auxiliary third valve 20' is functionally connected to the valve control means 29 configured to switch the pneumatic circuit 14 between the vacuum mode and the pressure mode. The valve control means 29 is configured to open the auxiliary third valve 20' when operating the pneumatic circuit 14 in the vacuum mode for the auxiliary intermediate tank 8' so as to allow a vacuum to form in the auxiliary first gas line 25' and in the auxiliary intermediate tank 8'. The valve control means 29 is configured to close the auxiliary third valve 20' when operating the pneumatic circuit 14 in the pressure mode for the auxiliary intermediate tank 8' so as to prevent pressurized fluid to enter the collector tank 17 of the collector arrangement 7 from the auxiliary third gas line 28' of the pneumatic circuit 14.

In the embodiment illustrated in FIG. 3, the valve control means 29 can be configured to switch the vacuum mode for the intermediate tank 8 on by closing the fourth valve 21 in the third gas line 28 and by closing the auxiliary fourth valve 21' in the auxiliary third gas line 28' and by opening the third valve 20 in the first gas line 25 and by opening the first valve 18 in the second gas line 27 to feed pressurized fluid from the pneumatic system 15 provided within the hull 4 of the marine vessel 2 to the aspirator pump 16 to create a vacuum in the collector tank 17 of the collector arrangement 7 provided within the hull 4 of the marine vessel 2 and to create a vacuum in the first gas line 25 and to create a vacuum in the intermediate tank 8 within the shell structure 3 so as to effect suctioning of liquid from the bottom section 5 to the intermediate tank 8 in the first liquid line 10.

In the embodiment illustrated in FIG. 3, the valve control means 29 can be configured to switch the vacuum mode for the auxiliary intermediate tank 8' on by closing the fourth valve 21 in the third gas line 28 and by closing the auxiliary fourth valve 21' in the auxiliary third gas line 28' and by opening the auxiliary third valve 20' in the auxiliary first gas line 25' and by opening the first valve 18 in the second gas line 27 to feed pressurized fluid from the pneumatic system 15 provided within the hull 4 of the marine vessel 2 to the aspirator pump 16 to create a vacuum in the collector tank 17 of the collector arrangement 7 provided within the hull 4 of the marine vessel 2 and to create a vacuum in the auxiliary first gas line 25' and to create a vacuum in the auxiliary intermediate tank 8' within the shell structure 3 so as to effect suctioning of liquid from said another bottom section 5' to the auxiliary intermediate tank 8' in the auxiliary first liquid line 10'.

In the embodiment illustrated in FIG. 3, the valve control means 29 can being configured to switch the pressure mode for the intermediate tank 8 on by closing the first valve 18 in the second gas line 27 and by closing the third valve 20 in the first gas line 25 and by opening the fourth valve 21 in the third gas line 28 to feed pressurized fluid from the pneumatic system 15 provided within the hull 4 of the marine vessel 2 in the third gas line 28 and in the first gas line 25 to the intermediate tank 8 within the shell structure 3 so as to effect pressing of liquid from the intermediate tank 8 within the shell structure 3 the bottom section 5 to the collector tank 17 of the collector arrangement 7 provided within the hull 4 of the marine vessel 2 in the second liquid line 12.

In the embodiment illustrated in FIG. 3, the valve control means 29 can being configured to switch the pressure mode for the auxiliary intermediate tank 8' on by closing the first valve 18 in the second gas line 27 and by closing the auxiliary third valve 20' in the auxiliary first gas line 25' and by opening the auxiliary fourth valve 21' in the auxiliary third gas line 28' to feed pressurized fluid from the pneumatic system 15 provided within the hull 4 of the marine vessel 2 in the auxiliary third gas line 28' and in the auxiliary first gas line 25' to the auxiliary intermediate tank 8' within the shell structure 3 so as to effect pressing of liquid from the auxiliary intermediate tank 8' within the shell structure 3 at said another bottom section 5' to the collector tank 17 of the collector arrangement 7 provided within the hull 4 of the marine vessel 2 in the auxiliary second liquid line 12' and in the second liquid line 12.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A draining arrangement of a propulsion unit such as an azimuthing propulsion unit of a marine vessel, the propulsion unit comprising a shell structure mounted below a hull of the marine vessel such that the shell structure is at least partly immersed in water, when the marine vessel floats in water,
    wherein the shell structure limiting at least one bottom section configured to receive liquids formed within the shell structure and/or liquids entering the shell structure from the outside of the shell structure, and
    wherein the draining arrangement comprising a pneumatically operated drainage arrangement in fluid connection with said at least one bottom section, wherein the pneumatically operated drainage arrangement is configured to at least partly drain said at least one bottom section and to transfer liquid from said at least one bottom section to a collector arrangement provided within the hull of the marine vessel,
    wherein the pneumatically operated drainage arrangement includes:
    an intermediate tank within the shell structure, wherein the intermediate tank is located at a vertical level that is above said at least one bottom section,
    a pressurizing arrangement functionally connected to the intermediate tank and configured to selectively provide a vacuum in the intermediate tank or an excess pressure in the intermediate tank,
    a first liquid line that is provided between the intermediate tank and said at least one bottom section, wherein the first liquid line is provided with a first check valve configured to prevent liquid to flow from the intermediate tank to said at least one bottom section and configured to allow liquid to flow from said at least one bottom section to the intermediate tank, and
    a second liquid line that is provided between the intermediate tank and the collector arrangement within the hull of the marine vessel, wherein the second liquid line is provided with a second check valve configured to prevent liquid to flow from the collector arrangement provided within the hull of the marine vessel to the intermediate tank and configured to allow liquid to flow from intermediate tank to collector arrangement provided within the hull of the marine vessel.

2. The draining arrangement according to claim 1, wherein said at least one bottom section is located at a vertical level below the propeller shaft.

3. The draining arrangement according to claim 1, wherein the pressurizing arrangement comprising a pneumatic circuit that is in fluid connection with a pneumatic system provided within the hull of the marine vessel and that is in fluid connection with the intermediate tank wherein the pneumatic circuit is configured to operate in a vacuum mode that applies a vacuum to the intermediate tank, and in a pressure mode that applies a pressure to the intermediate tank.

4. The draining arrangement according to claim 3, wherein the pneumatic circuit comprises an aspirator pump that is driven by the pneumatic system provided within the hull of the marine vessel and that is by a first gas line in fluid connection with the intermediate tank within the shell structure,
    the pneumatic circuit comprises a valve arrangement for selectively feeding pressurized gas from the pneumatic system provided within the hull of the marine vessel in a second gas line to the aspirator pump so as to operate the pneumatic circuit in the vacuum mode and so as to provide a vacuum in the first gas line, or feeding pressurized gas from the pneumatic system provided within the hull of the marine vessel in a third gas line to the intermediate tank within the shell structure so as to operate the pneumatic circuit in the pressure mode, and
    the valve arrangement being functionally connected to a valve control means configured to switch the pneumatic circuit between the vacuum mode and the pressure mode.

5. The draining arrangement according to claim 4, wherein a collector tank of the collector arrangement provided within the hull of the marine vessel forming a part of the first gas line of the pneumatic circuit, wherein the collector tank of the collector arrangement provided within the hull of the marine vessel being in the first gas line of the pneumatic circuit arranged between the aspirator pump and the intermediate tank within the shell structure.

6. The draining arrangement according to claim 4, wherein the third gas line of the pneumatic circuit being at a connection point between the collector tank of the collector arrangement and the intermediate tank within the shell structure in fluid connection with the first gas line of the pneumatic circuit so that the first gas line and the third gas line between the connection point and the intermediate tank within the shell structure have common piping,
    a third valve in the first gas line of the pneumatic circuit between the collector tank of the collector arrangement provided within the hull of the marine vessel and the connection point, and
    the third valve being functionally connected to the valve control means configured to switch the pneumatic circuit between the vacuum mode and the pressure mode.

7. The draining arrangement according to claim 4, wherein the valve arrangement comprises a first valve in the second gas line of the pneumatic circuit between the pneumatic system provided within the hull of the marine vessel and the aspirator pump,
    the valve arrangement comprises a fourth valve in the third gas line of the pneumatic circuit between the pneumatic system provided within the hull of the marine vessel and the intermediate tank within the shell structure, and the first valve and the fourth valve being functionally connected to the valve control means configured to switch the pneumatic circuit between the vacuum mode and the pressure mode.

8. The draining arrangement according to claim 7, wherein the valve control means being configured to switch the vacuum mode on by closing the fourth valve and by opening the first valve to feed pressurized fluid from the pneumatic system provided within the hull of the marine vessel to the aspirator pump to create a vacuum in the collector tank of the collector arrangement provided within the hull of the marine vessel and in the intermediate tan within the shell structure so as to effect suctioning of liquid from said at least one bottom section to the intermediate tank the first liquid line.

9. The draining arrangement according to claim 7, wherein the valve control means being configured to switch the pressure mode on by closing the first valve and by opening the fourth valve to feed pressurized fluid from the pneumatic system provided within the hull of the marine vessel to the intermediate tank within the shell structure so as to effect pressing of liquid from the intermediate tank within the shell structure at least one bottom section to the collector tank of the collector arrangement provided within the hull of the marine vessel in the second liquid line.

10. The draining arrangement according to claim 4, wherein a second valve in the pneumatic circuit between the aspirator pump and the collector tank of the collector arrangement provided within the hull of the marine vessel, and the valve control means being, when switching on the vacuum mode, configured to open the second valve, and the valve control means being, when switching on the pressure mode, configured to close the second valve.

11. The draining arrangement according to claim 4, wherein a pressure regulating valve in the pneumatic circuit between the pneumatic system provided within the hull of the marine vessel and the intermediate tank within the shell structure.

12. The draining arrangement according to claim 4, wherein a fifth valve in the second liquid line, the valve control means being, when switching on the vacuum mode, configured to close the fifth valve, and the valve control means being, when switching on the pressure mode, configured to open the fifth valve.

13. The draining arrangement according to claim 4, wherein the collector tank of the collector arrangement provided within the hull of the marine vessel being provided with a check valve configured to regulate the pressure inside the collector tank.

14. The draining arrangement according to claim 2, wherein the pressurizing arrangement comprising a pneumatic circuit that is in fluid connection with a pneumatic system provided within the hull of the marine vessel and that is in fluid connection with the intermediate tank, wherein the pneumatic circuit is configured to operate in a vacuum mode that applies a vacuum to the intermediate tank, and in a pressure mode that applies a pressure to the intermediate tank.

15. The draining arrangement according to claim 5, wherein the third gas line of the pneumatic circuit being at a connection point between the collector tank of the collector arrangement and the intermediate tank within the shell structure in fluid connection with the first gas line of the pneumatic circuit so that the first gas line and the third gas line between the connection point and the intermediate tank within the shell structure have common piping, a third valve in the first gas line of the pneumatic circuit between the collector tank of the collector arrangement provided within the hull of the marine vessel and the connection point, and the third valve being functionally connected to the valve control means configured to switch the pneumatic circuit between the vacuum mode and the pressure mode.

16. The draining arrangement according to claim 5, wherein the valve arrangement comprises a first valve in the second gas line of the pneumatic circuit between the pneumatic system provided within the hull of the marine vessel and the aspirator pump, the valve arrangement comprises a fourth valve in the third gas line of the pneumatic circuit between the pneumatic system provided within the hull of the marine vessel and the intermediate tank within the shell structure, and the first valve and the fourth valve being functionally connected to the valve control means configured to switch the pneumatic circuit between the vacuum mode and the pressure mode.

17. The draining arrangement according to claim 5, wherein a second valve in the pneumatic circuit between the aspirator pump and the collector tank of the collector arrangement provided within the hull of the marine vessel, and the valve control means being, when switching on the vacuum mode, configured to open the second valve, and the valve control means being, when switching on the pressure mode, configured to close the second valve.

18. The draining arrangement according to claim 5, wherein a pressure regulating valve in the pneumatic circuit between the pneumatic system provided within the hull of the marine vessel and the intermediate tank within the shell structure.

* * * * *